US008343268B2

(12) United States Patent
Ma et al.

(10) Patent No.: US 8,343,268 B2
(45) Date of Patent: Jan. 1, 2013

(54) INKS WITH IMPROVED PERFORMANCE

(75) Inventors: Zeying Ma, San Diego, CA (US); Peter C. Morris, San Diego, CA (US); Anne M. Kelly-Rowley, San Diego, CA (US); Stephen W. Bauer, San Diego, CA (US); William S. Cressman, San Diego, CA (US); Sean W. Dobbins, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1987 days.

(21) Appl. No.: 11/290,788

(22) Filed: Nov. 30, 2005

(65) Prior Publication Data

US 2007/0120928 A1 May 31, 2007

(51) Int. Cl.
*C09D 11/00* (2006.01)

(52) U.S. Cl. ............... 106/31.37; 106/31.6; 106/31.59; 106/31.89

(58) Field of Classification Search ............... 106/31.27, 106/31.6, 31.59, 31.89
See application file for complete search history.

(56) References Cited

U.S. PATENT DOCUMENTS

| 5,616,273 | A | 4/1997 | Clark et al. |
| 5,804,625 | A | 9/1998 | Temperante et al. |
| 5,939,476 | A | 8/1999 | Lassila et al. |
| 5,985,975 | A * | 11/1999 | Kurabayashi et al. ........ 524/462 |
| 6,506,806 | B2 | 1/2003 | Taylor et al. |
| 7,479,178 | B2 * | 1/2009 | Dodge et al. ............... 106/31.46 |
| 2001/0035110 | A1 * | 11/2001 | Kato ............................. 106/31.6 |
| 2003/0144375 | A1 * | 7/2003 | Wu et al. ....................... 523/160 |
| 2004/0069183 | A1 * | 4/2004 | Kamoto et al. ............ 106/31.27 |
| 2005/0004263 | A1 * | 1/2005 | Gould et al. .................. 523/160 |
| 2005/0054751 | A1 | 3/2005 | Namba et al. |
| 2007/0076071 | A1 * | 4/2007 | Iu et al. ......................... 347/100 |

FOREIGN PATENT DOCUMENTS

| CN | 1464668 | 12/2003 |
| CN | 1628157 | 6/2005 |
| EP | 1 201 719 A | 5/2002 |
| EP | 1243628 A1 * | 9/2002 |
| EP | 1 473 338 A1 | 11/2004 |
| EP | 1 533 349 A | 5/2005 |
| JP | 2003003102 A * | 1/2003 |
| WO | WO02092660 | 11/2002 |
| WO | 2006/030930 A | 3/2006 |
| WO | 2006/077991 A | 7/2006 |
| WO | 2006/083000 A | 8/2006 |

OTHER PUBLICATIONS

Machine English Translation of JP 2003-3102.*

* cited by examiner

*Primary Examiner* — Melvin C Mayes
*Assistant Examiner* — Veronica F Faison

(57) ABSTRACT

Inkjet ink formulations and methods using the same, with improved performance, wherein the inks are formulated to work as an ink set with darker inks having a higher dynamic surface tension.

31 Claims, 3 Drawing Sheets

INKS WITH IMPROVED PERFORMANCE

FIELD OF THE INVENTION

The present invention generally relates to ink-jet printing, and in particular, to inkjet inks and ink sets with improved print quality performance.

BACKGROUND OF THE INVENTION

The use of digital image-forming apparatuses such as, for example, thermal ink-jet printers, large-format plotters, piezo-electric printers, large form plotters, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business and household applications at costs lower than those offered in the past.

Commercial print media are smooth and glossy due to a nonporous coating on the surface of the media. The nonporous coating is a hydrophobic material, such as a hydrophobic polymer. Since this coating is hydrophobic, inks used in commercial printing are typically oil-based. In contrast, the majority of inks used in inkjet printing are aqueous-based. These inkjet inks are generally not compatible with the existing commercial print media because the aqueous-based inkjet inks do not penetrate into the nonporous coating, in particular in the fast throughput environment. Therefore, in order to print commercial volumes using inkjet printing, modified inkjet inks for use on commercial print media have been developed. However, images printed with these inkjet inks may have reduced resolution, durability, or print quality.

Due to the cost, higher lead time requirements, and efficiency limitations of other printing techniques, commercial printing (including digital printing) using inkjet printers ("commercial inkjet") is a rapidly developing area. The large volumes of items that are printed in commercial inkjet printing require high speed of the printing process. Reliable printer pens that do not need frequent servicing are also necessary because they contribute to the overall speed of the printing process. To improve the reliability of the printer pens and improve the speed of the printing process, inkjet inks, in particular as used in commercial printing should not puddle on a surface of a printhead, such as the orifice plate. Puddling is related to the ink's viscosity, with low-viscosity inks tending to puddle on the orifice plate and cause drop misdirection, ink accumulations on the orifice plate, and servicing difficulties. To reduce puddling, solutions that increase the viscosity of the ink have been proposed. For example, adding high molecular weight surfactants, polymers, or oligomers to the ink has been suggested. However, these additives typically have a deleterious effect on print quality and pen reliability, such as capped storage, kogation, decap, and waterfastness.

It would be desirable to provide printing inks for use in ink jet printers with improved print quality and reliability performance, in particular those for use in commercial inkjet printing as well as personal printing.

SUMMARY

The present invention is directed to printing liquids.

The inks of the present invention are formulated to work as part of an inkjet ink set. The inks comprise an aqueous vehicle; and at least one colorant dispersed in the vehicle and have predetermined dynamic surface tensions. In an embodiment, the darker color ink has a higher dynamic surface tension than the lighter color ink.

DETAILED DESCRIPTION OF EMBODIMENTS OF THE INVENTION

Figure 1A:
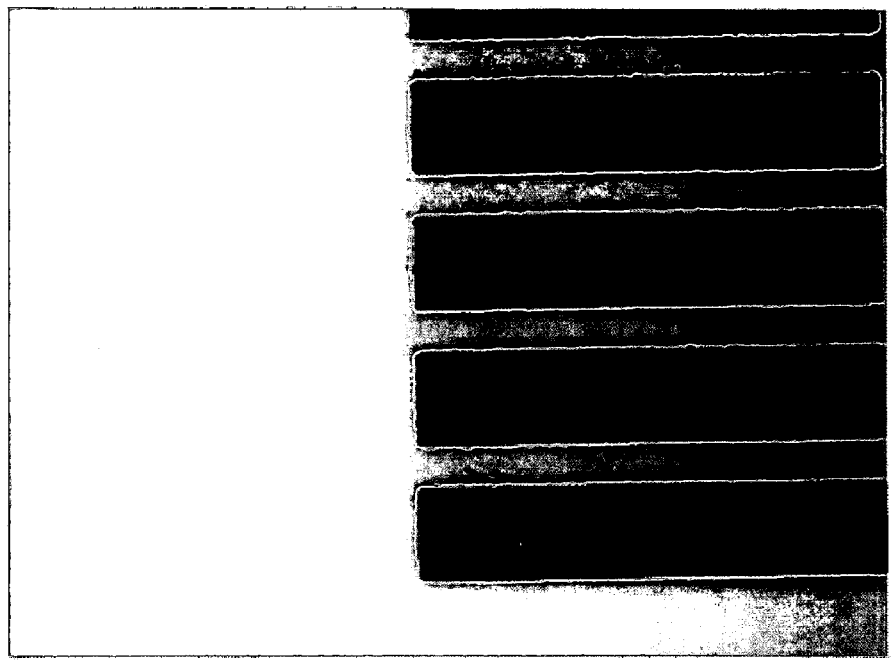
FIGS. 1A and 1B are representative print samples illustrating different bleed performances.

The present invention is directed to printing liquids. In an embodiment the liquid is usable in inkjet printing (e.g. either or both piezoelectric and thermal inkjet apparatus) using commercially available printers such as the DESKJET®, DESIGNJET®, and PHOTOSMART® families of printers; manufactured by Hewlett-Packard Company of Delaware. The inks of the present invention are particularly useful for imaging and photo printers, including commercial printers. The inks of the present invention are useful for printing on porous, non-porous, and hybrid glossy media and semi-glossy media, in particular micro-porous media for use in commercial printing applications such as graphic arts and photo retail requiring high throughput and high image quality as well as home photo printers. Exemplary print media include, but are not limited to, Hewlett-Packard Advanced glossy Photo Paper, Iford Galerie Pearl Photo Inkjet Paper (semi-gloss), Epson Premium Glossy Photo Paper, and Pictorico Photo Gallery glossy paper.

In an embodiment, the printing liquid may be an ink including a colorant dispersed in a vehicle ("ink"); or a clear liquid which is substantially free of colorant, the purpose of which is to enhance the print quality (e.g. gloss or saturation) of a printed image using the colored printing liquids or inks according to the present invention ("performance enhancing liquid"). As used herein, the term "dispersed" shall mean any mechanism by which a component, such as the colorant, is dispersed, dissolved, solubilized, mixed, or otherwise is made able to be carried by the vehicle. In an embodiment, the printing liquids make up, or are formulated for use as, a printing liquid set ("printing liquid set," or "ink set," or ink set and performance enhancing liquid). In an embodiment, the printing liquid set comprises a plurality of printing liquids including a first and a second liquid, each liquid comprising an aqueous vehicle.

Hereinafter, when the printing liquid includes a colorant, the printing liquid may be referred to as "ink", and the substantially free of colorant printing liquid may be referred to as the "performance enhancing liquid".

The inks of the present invention provide printed images having a high print quality at high throughput rates by reducing or minimizing visible bleed (bleed which is visible to the human eye) from one ink printed onto a medium into another ink color printed adjacent thereto. The term "bleed," as used herein, is defined as the invasion of one color into another, once the ink is deposited on the print medium, as evidenced by a ragged border therebetween. Bleed occurs as colors mix either on the surface of the print medium (e.g., paper), within the print medium itself, within the deposited ink layer, or any combination of the preceeding. The occurrence of bleed is particularly problematic between a darker ink (such as black ink) and an adjacently-printed lighter ink (such as yellow) because it is all the more visible. Hence, to achieve good print quality, bleed must be substantially reduced or eliminated such that borders between colors are clean and free from the invasion of one color into the other. Visible bleed may be reduced by either or both reducing actual bleed when there is in fact bleed from one ink color printed on a medium into another ink color printed adjacent thereto; as well as when such bleed, even though present, is not readily discernable by the naked eye.

In an embodiment, the printing liquids are configured to make up an ink set including at least one of each of black, cyan, magenta, and yellow inks, and optionally the performance enhancing liquid. In one embodiment, the ink set further includes "lighter" versions of any one or more of the black, cyan, magenta, or yellow inks; such as gray, medium and/or light gray, medium and/or light cyan, medium and/or light magenta, and medium and/or light yellow; respectively. The lighter inks may comprise the same or different colorants than that of their respective darker ink versions.

As used herein the terms light and dark refer to the relative hiding power of an ink; such that when an ink of higher hiding power is printed over an ink of a lower hiding power, the color observed is dominated by the ink having the higher hiding power. Colorant concentration is a primary factor in hiding power and can be measured in tone scales, such as "Value" of an ink (Munsell color space), or "L*" when using the (CIELAB color system). A universal description of hiding power is not limited to a tone scale definition. The complete tri-stimulus values may be measured and compared to the values of the separate colors to show that a dominant coloration is present or has occurred for the mixture or overlap of colors. The principle of hiding power or dominant color is particularly useful in this invention as it can describe a phenomena or mechanism where a "light" color can physically bleed into a "dark" color yet this invasion may not be visually observed and hence for utility, appears as though bleed has not occurred.

In an embodiment, the enhanced bleed performance is achieved by employing a predetermined differential in dynamic surface tensions of at least two inks configured or formulated for printing adjacent one another, also referred to herein as the dynamic surface tension gradient. The at least two inks may be configured or formulated to be used as an ink set. In an embodiment, the static surface tension is substantially the same for the two inks, normally all the inks configured for use as part of the ink set have similar static surface tensions.

In an embodiment, each of the inks (and/or the performance enhancing liquid as the case may be) includes a surfactant package comprising at least one fluorosurfactant and at least one hydrocarbon surfactant. In an embodiment, the dynamic surface tension gradient is substantially achieved by the type, and concentration of the hydrocarbon surfactant employed in formulation the liquid.

In an embodiment, the static surface tension is substantially the same for the inks (or liquids) configured or formulated for use as part of an ink set, as the static surface tension is primarily governed by the choice and presence of the fluorocarbon surfactant.

In an embodiment, either for inks having the same general hue but having different saturation or optical density (e.g., light and dark cyan), or inks generally having similar optical density but different hue (e.g., cyan and magenta), have the same or similar dynamic surface tensions. By way of example, the inks may be classified into different groups, such as black and gray ("Group I"), cyan and magenta ("Group II"), yellow ("Group III"), and optionally the performance enhancing liquid ("Group IV"); with the dynamic surface tension decreasing as the inks move from the first group (I) to the last group (IV). In an embodiment, the same or similar surfactant packages may be used in the inks belonging to the same Group. As used herein, the term "printed substrate" means a substrate that is at least partially covered with at least one ink embodying features of the invention. "Inkjet pen" means an inkjet pen which has either or both on-axis and off-axis configurations, including and/or configured to include the ink; "printing system" means a system for printing and/or including at least one or more of the inkjet inks embodying one or more features of the present invention, inkjet pen, and/or printer.

Inks

The aqueous ink jet inks embodying features of the invention employ an aqueous carrier medium ("vehicle") and a colorant. The colorant may be either a pigment dispersion, a dye, or combinations thereof, preferably a pigment dispersion (e.g., dispersed by way of a surfactant, polymeric dispersant, or self-dispersed). The inks include a surfactant package including at least one fluorocarbon surfactant and at least one hydrocarbon surfactant, both of which are described further below. The inks may also contain other additives known in the art of ink jet printing. The first and second aqueous inks jet inks are formulated so that they are compatible and provide minimal to no visible bleed when applied adjacent to or in contact with one another on a print medium.

Fluorocarbon Surfactant

The fluorocarbon surfactant, when present, in an ink or the performance enhancing liquid, is independently selected as an nonionic, anionic, cationic or amphoteric surfactant. In an embodiment, the fluorocarbon surfactant contains a perhalogenated or perfluorinated alkyl terminal group.

In an embodiment, the fluorocarbon surfactant may generally be added to an ink (or performance enhancing liquid) formulation in an amount ranging from about 0.0001 wt. % to about 1.0 wt. %, from about 0.01 wt. % to about 0.5 wt. %, or from about 0.1 to 0.25 wt. %, based on the total weight of the inkjet ink. The concentration of the fluorocarbon surfactant in the various liquids may be similar or different than that of other liquids for use as a set.

The specific fluorocarbon surfactant compound or compounds selected will vary based on the other components in the ink and the properties of the one or more inks configured for printing adjacent thereto. By way of example, the fluorocarbon surfactant is selected such that its ionic character is compatible with that of other components in the inks to avoid or minimize precipitation or flocculation in the ink.

In an embodiment, the fluorocarbon surfactant is of formula $(R_fQ)_nA$ wherein: $R_f$ is a perfluoroalkyl group having 6 to 22 carbon atoms; Q is a divalent bridging group capable of connecting the $R_f$ with the A group; A is a water soluble group; and n is 1 or 2.

The bridging Q group may be a di-radical of alkyl, aralkyl, alkylaryl, or aryl containing less than 10 carbon atoms, and may contain heteroatoms such as S, O, and N. The linkage between the bridging Q group and the water-soluble A group may be either, ester, amide, or sulfoamido; provided it is stable under the conditions of use.

The water-soluble A group may be selected from —$(OCH_2CH_2)_xOH$ wherein x is 1 to 12; —COOM and —$SO_3M$ wherein M is hydrogen, ammonium, amine, or an alkali metal such as lithium, sodium, or potassium; —$PO_4Z_y$ wherein y is 1 to 2 and Z is hydrogen, ammonium, amine, or an alkali metal such as lithium, sodium, or potassium; —NR$_3$X wherein R$_3$ is an alkyl group of 1 to 4 carbon atoms and X is an anionic counterion selected from the group consisting of halides, acetates, and sulfonates, and other water-soluble zwitterionic groups. The balance between the size of the perfluoroalkyl group and the water-soluble group should be such that the compound as a whole has a solubility in the desired aqueous vehicle of at least 0.001% at 25° C., preferably at least 0.05% at 25° C. Suitable fluorinated compounds are commercially available from companies such as E. I. du Pont de Nemours and Company (Wilmington, Del.) as Zonyl® and from 3M Company (Minneapolis, Minn.) as Fluorad®, which may be used alone or in combinations.

In the ZONYL® series of fluorocarbon surfactants, ZONYL® FSO, ZONYL® FSN, and ZONYL® FS-300 are exemplary nonionic fluorocarbon surfactants that may be used in the present invention; with ZONYL® FSD being an exemplary cationic fluorocarbon surfactant. ZONYL® FSO is an ethoxylated nonionic fluorocarbon surfactant having the formula R$_f$CH$_2$CH$_2$O(CH$_2$CH$_2$O)$_x$H, wherein R$_f$ is F(CF$_2$CF$_2$)$_y$, x is 0 to approximately 15, and y is 1 to approximately 7. As supplied, ZONYL® FSO has about 50% fluorosurfactant. ZONYL® FSN is a water soluble, ethoxylated non-ionic fluorosurfactant that has the structure of R$_f$CH$_2$CH$_2$O(CH$_2$CH$_2$O)$_x$H, wherein R$_f$ is F(CF$_2$CF$_2$)$_y$, x is 0 to approximately 25, and y is 1 to approximately 9. ZONYL® FSN is supplied having about 40% fluorosurfactant. ZONYL® FS-300 is a nonionic fluorosurfactant having the structure R$_f$CH$_2$CH$_2$O(CH$_2$CH$_2$O)$_x$H, wherein R$_f$ is F(CF$_2$CF$_2$)$_y$, x is 3 to approximately 30, and y is 2 to approximately 20, wherein X<Y<Z. As supplied, ZONYL® FS-300 has about 40% fluorosurfactant. ZONYL® FSD is a cationic fluorosurfactant and has the structure F(CF$_2$CF$_2$)$_{1-7}$-alkyl-N$^+$R$_3$Cl$^-$. ZONYL® FSD is supplied having about 30% fluorosurfactant. Preferably, the fluorocarbon surfactant used is ZONYL® FSO.

The FLUORAD® fluorocarbon surfactants include ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740).

Other suitable fluorocarbon surfactants in the practice of the invention include those formed at least in part from a polymer made based on oxetane chemistry having the formula below and including a pendant perfluoroalkyl group R$_f$

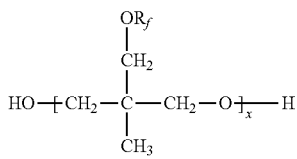

R$_f$ = CH$_2$CF$_3$ | CH$_2$CF$_2$CF$_3$

Wherein the length of the pendant perfluoroalkyl group is selected from the group consisting of C$_4$F$_9$ or shorter including CF$_3$, C$_2$F$_5$, C$_3$F$_7$ and C$_4$F$_9$.

In an embodiment, the oxetane-based fluorocarbon surfactant is formed from at least a polymeric material having at least one polar group and having at least one pendant group comprising an R$_f$ group, the polymeric material having at least 2 repeat units, wherein each at least one polar group, independently, is selected from a group consisting of an anion-countercation; a cation-counteranion; an amphoteric group, and a non-ionic group; wherein each R$_f$ group, independently, is selected from a group consisting of a fluorinated linear alkyl having from 1 to about 7 carbon atoms; and a fluorinated branched alkyl wherein the longest chain is from 1 to about 7 carbon atoms and each branch, independently, contains from 1 to about 3 carbon atoms; and wherein each R$_f$, whether linear or branched, has at least one carbon atom bonded to at least one fluorine atom; and wherein each R$_f$ group, independently, has at least 10% of the non-carbon atoms being fluorine atoms and the remaining non-carbon atoms being independently selected from the group consisting of: H, I, Cl, and Br.

Examples of suitable oxetane-based fluorocarbon surfactants, include, but are not limited to those generally available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, and PolyFox PF-156A.

Hydrocarbon Surfactant

The hydrocarbon surfactant, when present, in an ink or the performance enhancing liquid, is independently selected as a nonionic, anionic, cationic or amphoteric surfactant. The hydrocarbon surfactant is preferably nonionic.

The hydrocarbon surfactants suitable for use in the present invention include any hydrocarbon surfactant that is, independently, compatible with the other components of the fluid in which it is used and provides fluids having relatively low dynamic surface tension. Dynamic surface tension, as used herein, means lowering the surface tension of the liquid as a function of time.

The hydrocarbon surfactant for use in the inks or the performance enhancing liquid, is selected such that there is a dynamic surface tension gradient or differential across at least two inks (e.g., first and second inks) formulated to be used as an ink set. In one embodiment, the lighter colored ink has a lower dynamic surface tension than the relatively darker ink. In an embodiment, the hydrocarbon surfactant for each ink is selected such that the dynamic surface tension decreases going from the darkest to the lightest ink. In one exemplary embodiment, the dynamic surface tension of the black ink is the highest, and that of the yellow ink is the lowest, and that for the magenta and cyan inks are therebetween.

In an embodiment the dynamic surface tension for each one or a plurality of the inks or performance enhancing liquid, independently, generally decreases from about 50 to about 20 dynes/cm, from about 40 to about 25 dynes/cm, or from about 35 to 30 dynes/cm; over a period of about 10 to about 100 mili-seconds as measured by a dynamic surface tensiometer such as Kruss BP2 Dynamic Surface Tensiometer. According to an embodiment of the present invention, there is a difference in the dynamic surface tension between the different ink groups, i.e., Group I (dark), Group II (medium), Group III (light), and Group IV (the performance enhancing liquid). In an embodiment, the difference in the dynamic surface tension between the dark and the lighter ink, as measured during the time period and method stated above, is at least generally from about 1 to about 10, from about 2 to about 6, from about 2 to about 5, from about 3 to 5, or about 5, dynes/cm.

The static surface tension of the inks or the performance enhancing liquid having relatively low static surface tension, independently, generally ranges from about 30 to about 15, from about 25 to about 18, or from about 22 to 20 dynes/cm; as measured by a static surface tensiometer such as Kruss Processor K-12 Surface Tesnsiometer.

In an embodiment, the hydrocarbon surfactant may generally be added to the ink or the performance enhancing liquid, independently, in an amount generally ranging from about 0.0001 wt. % to about 1 wt. %, from about 0.01 wt. % to about 0.5 wt. %, or from about 0.1 to about 0.6 wt. %; based on the total weight of the ink (or performance enhancing liquid).

The specific selected hydrocarbon surfactant will vary based on the other components in the ink and the properties of the one or more inks configured for printing adjacent thereto. By way of example, the hydrocarbon surfactant is selected such that its ionic character is compatible with that of other components in the ink to avoid or minimize precipitation or flocculation in the ink.

Exemplary hydrocarbon surfactants having such dynamic surface tension properties include, but are not limited to: nonionic hydrocarbon surfactants such as the TETRONIC® series (tetrafunctional block copolymers of propylene oxide, ethylene oxide such as Tetronic 701, and ethylene diamine) available from BASF Canada (Toronto, Ontario); the TERGITOL® series (alkyl polyethylene oxides) available from Union Carbide Co. (Houston, Tex.) such as Tergitol 15-S-5, 15-S-7; the BRIJ® series (polyethoxylated alcohols and esters) such as Brij 30 available from ICI Americas (Wilmington, Del.), the SURFYNOL® series (acetylenic polyethylene oxides) such as Surfynol 104 (2,4,7,9-tetramethyl-5-decyne-4,7-diol), Surfynol 400 series such as Surfynol 440, and Surfynol CT series, such as Surfynol CT-111 and CT-211 (as shown and described below) (available from Air Products (Allentown, Pa.); DYNOL® 604 (an ethoxylated acetylenic diol mixture) from Air Products and Chemicals Inc. (Allentown, Pa.); the TRITON® series (alkyl phenyl polyethylene oxides) such as Triton X-45 available from Rohm & Haas (Philadelphia, Pa.) and those available from Dow Chemical Corporation (Midland, Mich.) such as TRITON® X-100 (an octylphenoxypolyethoxyethanol); Aerosol OT (a sodium dioctyl sulfosuccinate) from CYTEC Industries (West Paterson, N.J.); WITCONATE P-1059 (an alkaryl sulfonate isopropylamine salt) from CK Witco Corporation (Houston, Tex.); SURFADONE LP-100 (an N-octyl-2-pyrrolidone) from International Specialty (Wayne, N.J.); MERPOL SE (5EO adduct of tridecyl alcohol), a nonionic surfactant, from Stepan Company (Northfield, Ill.); and MERPOL SH (8EO adduct of tridecyl alcohol) from Stepan Company (Northfield, Ill.).

Exemplary chemical formulae for some of the fluorocarbon surfactants are provided below:

FORMULA I
Various Surfynol

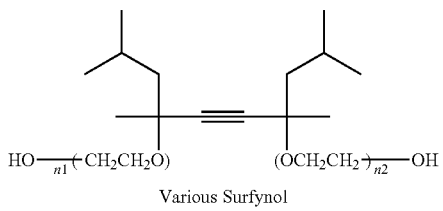

Various Surfynol

Wherein

| Hydrocarbon surfactant | Value of n | HLB value |
|---|---|---|
| Surfynol 104 | $n1 = n2 = 0$ | HLB = 4 |
| Surfynol 420 | $n1 = n2 = 1$ | HLB = 4 |

FORMULA I
Various Surfynol

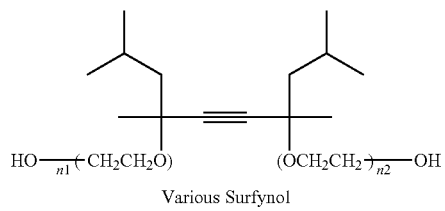

Various Surfynol

Wherein

| Hydrocarbon surfactant | Value of n | HLB value |
|---|---|---|
| Surfynol 440 | $n1 = n2 = 3.5$ | HLB = 8 |
| Surfynol 465 | $n1 = n2 = 10$ | HLB = 13 |
| Surfynol 485 | $n1 = n2 = 30$ | HLB = 17 |

FORMULA II
Tergitol

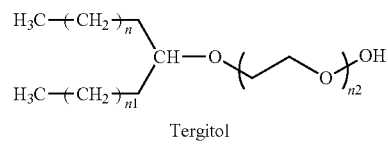

Tergitol

Wherein

| Hydrocarbon surfactant | Value of n |
|---|---|
| Tergitol 15-S-5 | $n + n_1 = 12$, $n_2 = 4$ |
| Tergitol 15-S-7 | $n + n_1 = 12$, $n_2 = 6$ |
| Tergitol 15-S-9 | $n + n_1 = 12$, $n_2 = 8$ |

Formula III

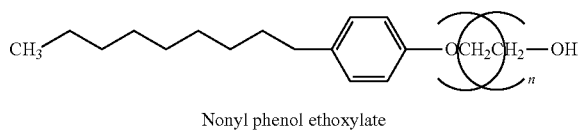

Nonyl phenol ethoxylate

Colorant

The colorant may be a dye, a pigment, or a combination of both. More than one dye or pigment may be used in any ink formulation. Preferably, the inks include a pigmented colorant suitable for use in inkjet formulations. The following exemplary pigments are useful in the practice of this invention; however, this listing is not intended to limit the invention: pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140; Cabot: Monarch® 1400, Monarch® 1300, Monarch® 1100, Monarch® 1000, Monarch® 900, Monarch® 880, Monarch® 800, and Monarch® 700; Cab- O-Jet® series of self-dispersed pigments such as Cab-O-Jet 200, 300, (black), Cab-O-Jet 1027R (red), Cab-O-Jet 554B (blue), Cab-O-Jet 270Y (yellow), Cab-O-Jet 250C (cyan), Cab-O-Jet 260M (magenta), PY-74 Yellow; Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B; Degussa: Printex U, Printex V, Printex 140U, and Printex 140V; DuPont: Tipure® R-101; Heubach: Dalamar® Yellow YT-858-D and Heucophthal® Blue G XBT-583D; Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B; Mobay: Quindo® Magenta, Indofast® Brilliant Scarlet, Quindo® Red R6700, Quindo® Red R6713, and Indofast® Violet; Sun Chem: L74-1357 Yellow, L75-1331 Yellow, and L75-2577 Yellow, Pigment Red PR122 Red; Clariant Hostajet® PT and ST series: Hostajet Yellow 4G-PT VP 2669, Hostajet Magenta E-PT VP 2690, Hostajet Cyan BG-PT VP 2689, Hostajet Black O-PT VP 2676; Hostajet Yellow 4G-ST VP 2745, Hostajet Magenta E-ST, Hostajet Cyan BG-ST VP 2778. Other exemplary pigments include anthraquinone red (PR177), pyrrole red (PR254), anthraqinone scarlet (PR168), quinacridone magenta (PR202), phthalocyanine green (PG36), chlorinated copper phthalocyanine green (PG7), dioxazine violet (PV23), and beta quinacridone violet (PV19); available from Companies such as Sun Chemical and Clariant.

If the colorant is a dye, the dye may be nonionic, cationic, anionic, or a mixture of nonionic, cationic, and/or anionic dyes. Dyes are well known in the art and are commercially available from numerous sources including, but not limited to, Avecia (Wilmington, Del.), Mitsubishi Chemical Corp. (Tokyo, Japan), and Ilford AG (Fribourg, Switzerland). The dyes included may be Acid dyes, Direct dyes, Food dyes, Mordant dyes, or Reactive dyes and may be water-soluble or water-insoluble. Examples of dyes include, but are not limited to, sulfonate and carboxylate dyes, such as those dyes that are commonly employed in inkjet printing. Specific examples of dyes that may be used in the inkjet ink include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isosyanate, Safranine O, Azure B, and Azure B Eosinate, all of which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

In addition to color dyes or pigments, black dyes or pigments may be used in the inkjet ink. For example, Direct Black 154, Direct Black 168, Fast Black 2, Direct Black 171, Direct Black 31, Direct Black 19, Acid Black 1, Acid Black 191, Mobay Black SP, or Acid Black 2 may be used.

As used herein, the term "pigment" refers to a colorant that is insoluble in the aqueous vehicle, and includes disperse dyes and self-dispersed pigments, using various dispersion chemistries (e.g., by way of polymeric dispersion, ionic dispersion, surface modified dispersion, to name a few). A wide variety of organic and inorganic pigments, alone or in combination, may be selected to make the ink, examples of which are disclosed in U.S. Pat. No. 5,085,698. The dispersed pigment particles are sufficiently small to permit free flow of the ink through the inkjet printing device, especially at the ejecting nozzles that usually have a diameter ranging from 10 micron to 50 micron. The particle size also has an influence on the pigment dispersion stability, which is critical throughout the life of the ink. Brownian motion of minute particles can help prevent the particles from flocculating. It is also desirable to use small particles for maximum color strength and gloss. The range of useful particle size is approximately 0.005 micron to 15 micron. Preferably, the pigment particle size should range from 0.005 to 5 micron and, next preferably, from 0.010 to 1 micron, and most preferably, from about 0.010 to 0.3 micron.

The colorant, when present in the ink (dye, pigment, or combination thereof), may be added to the ink in an amount generally ranging from about 0.1 to about 15%, from about 0.2 to about 10%, or from about 0.5 to about 5%, by weight, based on the total weight of the ink.

Aqueous Vehicle

The vehicle for the ink or the performance enhancing liquid may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Representative water-soluble organic solvents that may be selected are disclosed in U.S. Pat. No. 5,085,698, the full disclosure of which is incorporated herein by reference.

More specifically, the water-soluble organic solvent may include, but is not limited to, aliphatic alcohols, aromatic alcohols, diols, glycol ethers, poly(glycol) ethers, caprolactams, formamides, acetamides, and long chain alcohols, or any mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,3-alcohols of 30 carbons or less, ethylene glycol alkyl ethers, propylene glycol alkyl ethers, poly(ethylene glycol) alkyl ethers, higher homologs of poly (ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific organic solvents that are preferably employed in the practice of this invention include, but are not limited to, N-methyl pyrrolidone, 1,5-pentanediol, 2-pyrrolidone, 1-(2-hydroxyethyl)-2-pyrrolidone, diethylene glycol, 1,3-(2-methyl)-propanediol, 1,3,5-(2-methyl)-pentanetriol, tetramethylene sulfone, 3-methyl-1-butanol, glycerol, 3-pyridylcarbinol, pentaerythritol, 1,6-hexanediol, 1,2-alkyldiols, and mixtures thereof. For instance, the water-soluble organic solvent in the ink vehicle may include a mixture of diol, a polyglycol ether, and a glycol ether.

In the case of a mixture of water and at least one water-soluble solvent, the aqueous carrier medium usually comprises from about 30% to about 95% water. Generally the compositions may comprise from about 60% to about 95% water, based on the total weight of the aqueous carrier medium. The water-soluble organic solvent(s), independently, may generally be added to the liquid (e.g., ink or performance enhancing liquid) in an amount generally ranging from about 1 wt % to about 50 wt % of the total weight of the liquid formulation; from about 2 to about 45 wt %, or from about 5 to about 35 wt %.

Additional Components

Consistent with the invention, various types of additives, may be employed in the inks (or the performance optimizing liquid) to optimize the properties of the ink compositions for specific applications. The remainder of the ink compositions is mostly water; however, other independently selected components including surfactants, humectants, anti-cogation additives, anti-corrosive additives, polymers, preservatives, biocides that inhibit growth of microorganisms such as the preservative PROXEL™ GXL (available from Avecia Incorporated); chelating agents (or sequestering agents) such as EDTA that eliminate deleterious effects of heavy metal impurities; buffers; and viscosity modifiers, may be added to improve various properties of the ink composition.

Buffers may be used to maintain the inkjet ink at a desired pH. The buffer may be an organic-based biological buffer or an inorganic buffer. The buffers employed are chosen to sufficiently maintain the pH in the desired range. Examples of buffers include Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO").

EXAMPLES

The general composition of exemplary inkjet inks made according to the present invention is shown in TABLE I, along with exemplary ranges of amount of ingredients making up each component. The inkjet ink may be cyan, magenta, yellow, or black, depending on the colorant that is used (including the lighter versions of those stated above, i.e., light cyan, light magenta, and gray). Each ink may include one or more colorant at independently selectable concentrations, hues, values, and chromas. The pH of the inks were adjusted, as necessary with either NaOH or $HNO_3$.

TABLE I

| Ingredient | Amount added to make the wt. % |
| --- | --- |
| Fluorocarbon surfactant | about 0.0001 to about 1.0; |
| | about 0.01 to about 0.5; |
| | about 0.1 to about 0.25 |
| Hydrocarbon surfactant | about 0.01 to about 1; |
| | about 0.1 to about 0.8; |
| | about 0.2 to about 0.6 |
| Colorant (when present) | about 0.1 to about 15; |
| | about 0.2 to about 10; |
| | about 0.5 to about 5 |
| Polymeric binder | about 0 to about 10; |
| | about 0.1 to about 5; |
| | about 0.3 to about 3 |
| Water soluble organic solvent | about 1 to about 75; |
| | about 2 to about 50; |
| | about 5 to about 25 |
| Buffer | about 0 to about 0.5; |
| | about 0 to about 0.2; |
| | about 0 to about 0.1 |

TABLE I-continued

| Ingredient | Amount added to make the wt. % |
| --- | --- |
| Preservative/biocide | about 0.05 to about 0.5; |
| | about 0.05 to about 0.35; |
| | about 0.05 to about 0.2 |
| Sequestering Agent | about 0 to about 1; |
| | about 0.002 to about 0.5; |
| | about 0.002 to about 0.3 |
| Water | Substantially the remainder |

Inks were formulated and different performance attributes of the formulated inks were observed or measured in an effort to assess the benefits attained in the practice of the invention, such as, the effect of different surfactant packages on visible bleed while maintaining or improving the other print quality and pen performance attributes. The inks generally comprised colorant (e.g., pigment dispersion), polymeric binder, biocide, glycols, 2-pyrrolidone, glycerol, hexanediol (1,2 and/or 1,6), buffers, biocides, and water. It should be noted that all inks contained a fluorocarbon surfactant such as Zonyl FSO. In exemplary formulations the Zonyl FSO was present at 0.19 wt. % (based on the product as is provided by manufacturer). The inks had similar static surface tensions of approximately 20-23 dynes/cm.

Figure 1B:
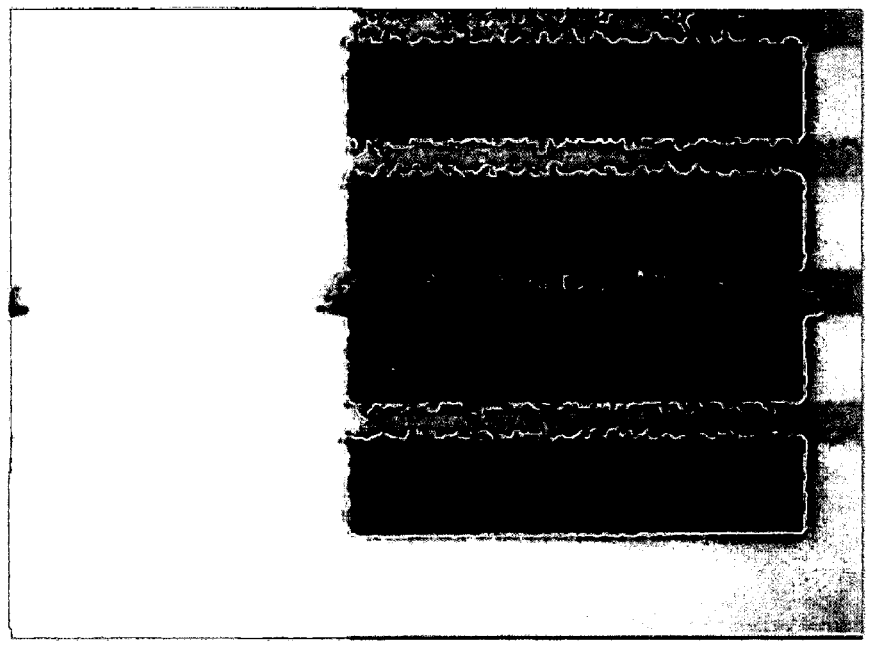

Inkjet pens were filled with the ink samples and bleed diagnostic targets were printed on HP Productivity Photo glossy media (such as part number Q1938A). The diagnostic prints were evaluated using a visual bleed scale ranging from +2 (poor) to −2 (very good). Exemplary black and white images of diagnostic prints representing very good (−2) to poor (+2) and bleed performance are shown in FIGS. 1A and 1B.

Figure 2A:
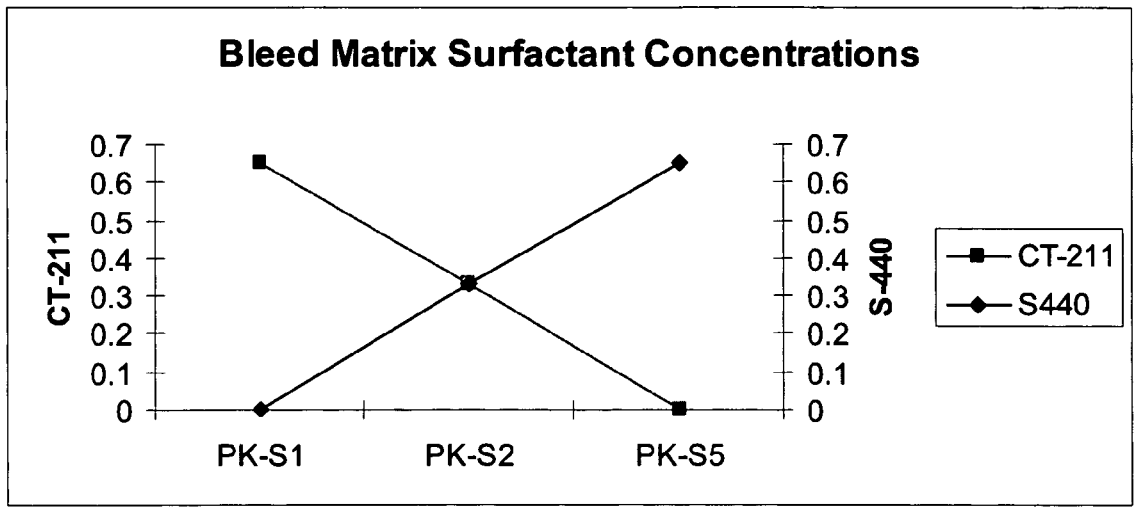
FIGS. 2A and 2B are graphical representations of surfactant packages useable in the practice of embodiments of the invention.
Figure 2B:
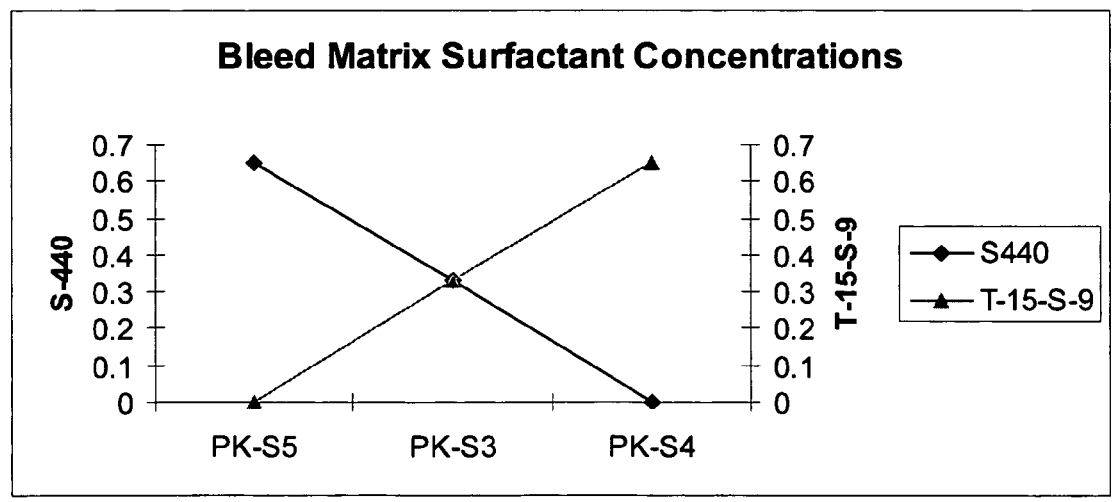

In one set of experiments, inks were formulated having hydrocarbon surfactant packages (plus Zonyl FSO) as shown in Table II; with bleed performance evaluated as described above, the results of which are shown in Table III. The matrix for the usage of the hydrocarbon surfactant in the ink samples is further represented in FIGS. 2A and 2B.

TABLE II

| Ink ID[1,2] | Surfynol CT-211 (wt. %) | Surfynol 440 (wt. %) | Tergitol 15S9 (Wt. %) | Dynamic Surface Tension (dynes/cm) @ 10 msec |
| --- | --- | --- | --- | --- |
| PK-S1 | 0.65 | 0 | 0 | 30 |
| PK-S2 | 0.33 | 0.33 | 0 | 32 |
| PK-S3 | 0 | 0.33 | 0.33 | 35 |
| PK-S4 | 0 | 0 | 0.65 | 38 |
| PK-S5 | 0 | 0.65 | 0 | 40 |
| PY-S1 | 0.65 | 0 | 0 | 30 |
| PY-S2 | 0.33 | 0.33 | 0 | 32 |
| PY-S3 | 0 | 0.33 | 0.33 | 35 |
| PY-S4 | 0 | 0 | 0.65 | 38 |
| PY-S5 | 0 | 0.65 | 0 | 40 |

Note:
[1]The second letter in each ink ID denote the color of the ink, black (K) or yellow (Y), respectively.

TABLE III

BLEED SCORE (−2 to +2)
Scoring invasion of black into yellow ink on micro-porous coated photo glossy media
Lower number indicates less bleed and better performance

|  |  | PY-S1 CT-211 | PY-S2 CT-211 and S440 | PY-S5 S440 | PY-S3 S440 and T15S9 | PY-S4 T15S9 |
|---|---|---|---|---|---|---|
| PK-S1 | CT-211 | 0.5 | 0.5 | 1 | 1 | 1.5 |
| PK-S2 | CT-211 and S440 | 0 | 0.5 | 1 | 1 | 1 |
| PK-S5 | S440 | −0.5 | 0 | 0.5 | 0.5 | 1 |
| PK-S3 | S440 and T15S9 | −1 | −1 | −0.5 | 0 | 0.5 |
| PK-S4 | T15S9 | −1.5 | −1 | −1 | −0.5 | 0 |

As can be seen from the data represented in Table III, the black/yellow ink sets PKS4/PYS1 (high dynamic surface tension black/low dynamic surface tension yellow) and PKS1/PYS4 (low dynamic surface tension black/high dynamic surface tension yellow), exhibited, respectively, the best and the worst relative bleed performance in this experiment, indicating that a dynamic surface tension gradient of higher to lower as the ink color changes from darker to lighter provides for better visual bleed control/optimization (lower number indicating less visible bleed).

Figure 3:
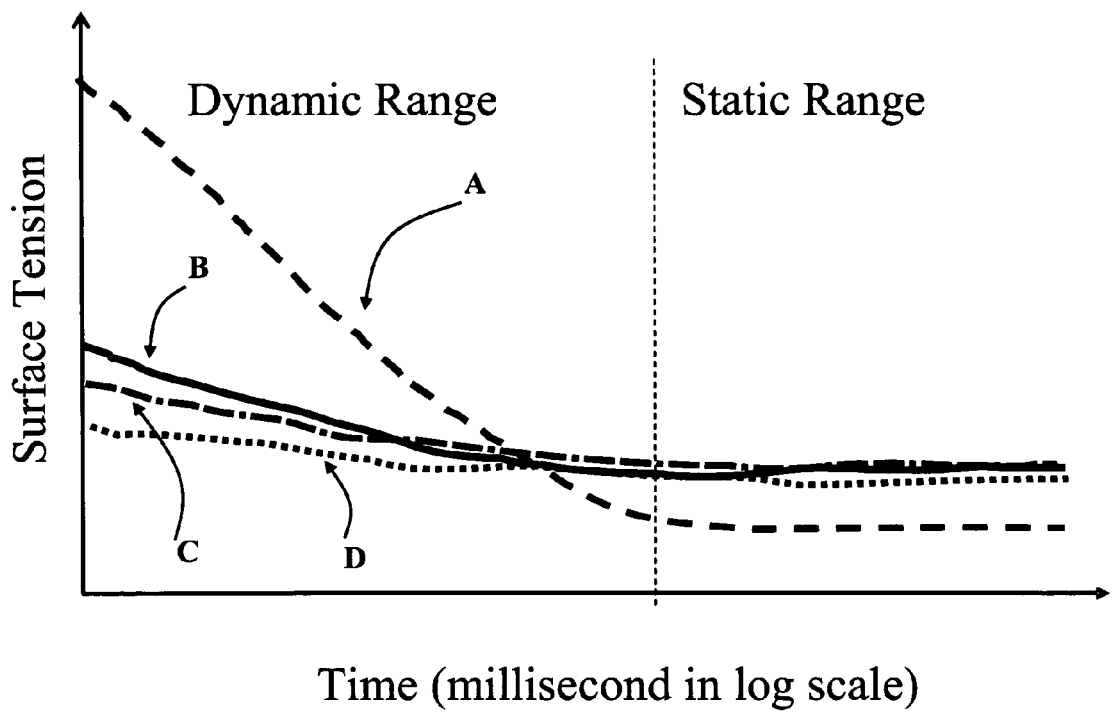
FIG. 3 is a graphical representation of the relative effect of different surfactants, usable in embodiments of the invention, on dynamic and static surface tension.

FIG. 3 is an exemplary diagram representative of the relative dynamic and static surface tensions of liquids prepared with surfactant packages comprising: (A) Zonyl FSO, (B) Tergitol 15-S-9/15-S-7 plus Zonyl FSO, (C) Surfynol 440/CT211 plus Zonyl FSO, and (D) surfynol CT211 plus Zonyl FSO. As can be seen from FIG. 3, the fluorocarbon surfactant, Zonyl FSO, has a relatively extreme high dynamic surface tension but very low static surface tension. The hydrocarbon surfactants have relatively flat profile, as compared to the Zonyl FSO, however, vehicles including surfactant packages according to the present invention exhibited sufficient differential between their dynamic surface tension to effectively reduce bleed between the printed colors.

In another set of experiments, inks were formulated having hydrocarbon surfactant packages (plus Zonyl FSO) as shown in Table IV, with bleed performance evaluated as described above: The black, medium gray, and light gray inks comprised Tergitol 15-S-9/15-S-7 plus Zonyl FSO (B); the cyan, light cyan, magenta, and light magenta inks comprised Surfynol 440/CT211 plus Zonyl FSO (C), and yellow inks and performance enhancing liquid comprised surfynol CT211 plus Zonyl FSO (D).

The ink set formulated according to the inks above, demonstrated very good bleed performance (e.g., −2) for diagnostic targets generated using various combinations of the formulated inks.

TABLE IV

| Ink ID*[1],*[2] | Surfynol CT-211 (wt. %) | Surfynol 440 (wt. %) | Tergitol 15S9 (Wt. %) | Tergitol 15S7 (Wt. %) | Dynamic Surface Tension (dynes/cm) @ 10 msec |
|---|---|---|---|---|---|
| LM | 0.16 | 0.47 | 0 | 0 | 33 |
| LC | 0.16 | 0.47 | 0 | 0 | 33 |
| DK | 0 | 0 | 0.25 | 0.25 | 36 |
| LG | 0 | 0 | 0.25 | 0.25 | 36 |
| MG | 0 | 0 | 0.25 | 0.25 | 36 |
| DM | 0.16 | 0.47 | 0 | 0 | 33 |
| DY | 0.65 | 0 | 0 | 0 | 30 |
| DC | 0.16 | 0.47 | 0 | 0 | 33 |

Note:
*[1]The first letter in each ink ID denotes light (L), medium (M), or dark (D) density; while the second letter denotes the color of the ink, Magenta (M), Cyan (C), black (K), gray (G), and yellow (Y).

Figure 4:
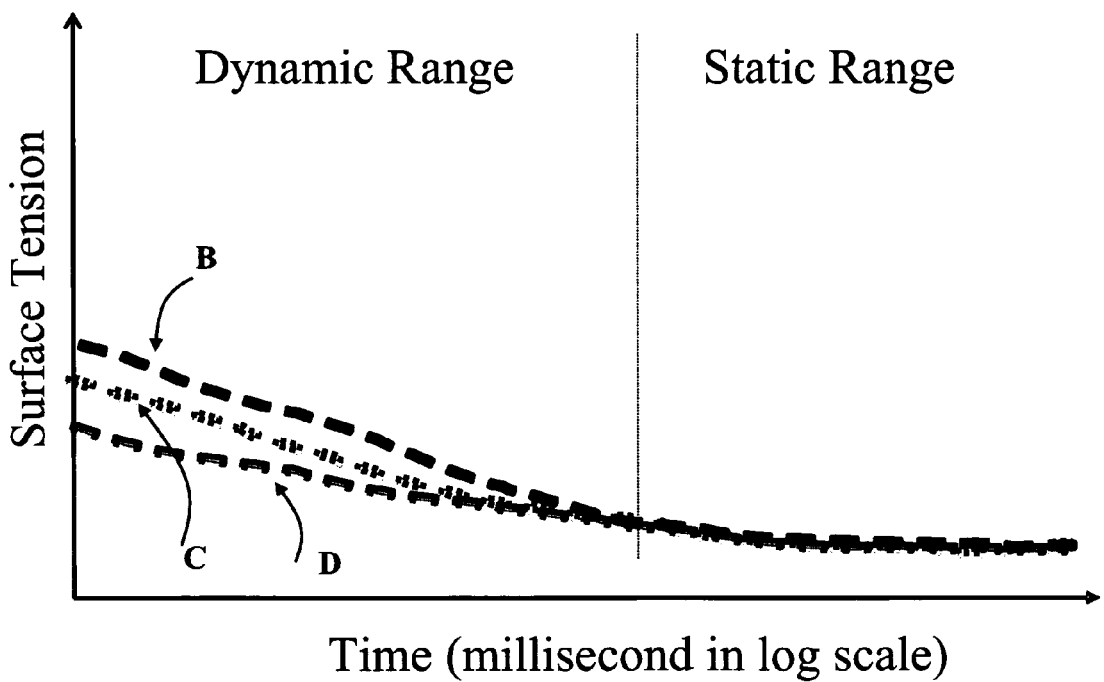
FIG. 4 is a graphical representation of the relative dynamic and static surface tension of inks made according to one exemplary embodiment of the invention.

As can be seen from FIG. 4, inks formulated with the surfactant packages according to Table IV, exhibited sufficient differential between their dynamic surface tension to effectively reduce bleed between the printed colors.

By way of comparison, in another set of experiments, inks were formulated with hydrocarbon surfactant packages (plus Zonyl FSO) as shown in Table V, with bleed performance evaluated as described above. The ink set formulated according to this set of inks, demonstrated very poor bleed performance (e.g., +2) for diagnostic targets generated using various combinations of the formulated inks. As can be noted, the inks in this set of formulations did not have the requisite dynamic surface differential.

TABLE V

| Ink ID*[1],*[2] | Surfynol CT-111 (wt. %) | Surfynol 440 (wt. %) | Tergitol 15S9 (Wt. %) | Tergitol 15S7 (Wt. %) | Dynamic Surface Tension (dynes/cm) @ 10 msec |
|---|---|---|---|---|---|
| LM | 0.16 | 0.47 | 0 | 0 | 33 |
| LC | 0.16 | 0.47 | 0 | 0 | 33 |
| DK | 0.16 | 0.47 | 0 | 0 | 33 |
| LG | 0.16 | 0.47 | 0 | 0 | 33 |
| MG | 0.16 | 0.47 | 0 | 0 | 33 |
| DM | 0.16 | 0.47 | 0 | 0 | 33 |
| DY | 0 | 0.65 | 0 | 0 | 30 |
| DC | 0 | 0.65 | 0 | 0 | 30 |

Note:
*[1]The first letter in each ink ID denotes light (L), medium (M), or dark (D) density; while the second letter denotes the color of the ink, Magenta (M), Cyan (C), black (K), gray (G), and yellow (Y).

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

Terms such a "element," "member," "component," "device," "section," "portion," "step," "means," and words of similar import, when used herein shall not be construed as invoking the provisions of 35 U.S.C. §112(6) unless the following claims expressly use the term "means" followed by a particular function without specific structure or the term "step" followed by a particular function without specific action. Accordingly, it is not intended that the invention be limited, except as by the appended claims. All patents and patent applications referred to herein are hereby incorporated by reference in their entirety.

What is claimed is:

1. An inkjet ink set, comprising:
   a. A plurality of inks including at least a first and a second ink, each ink comprising an aqueous vehicle;
   b. a first colorant dispersed in the first ink having a pre-determined dynamic surface tension; and
   c. a second colorant being different than the first colorant and dispersed in the second ink, the second ink being darker than the first ink and having a pre-determined dynamic surface tension greater than the dynamic surface tension of the first ink, wherein the first and second inks have substantially similar static surface tensions.

2. An Inkjet ink set according to claim 1, wherein both the first and second inks, each independently, include a surfactant package comprising at least one fluorocarbon surfactant and at least one hydrocarbon surfactant.

3. An Inkjet ink set according to claim 2, wherein the static surface tension of the first and second inks is primarily affected by the fluorocarbon surfactant.

4. An Inkjet ink set according to claim 2, wherein the difference in the dynamic surface tension of the first and second inks is primarily affected by the hydrocarbon surfactant.

5. An inkjet ink set according to claim 2, wherein the ink set comprises cyan, magenta, yellow, and black inks; and wherein the black ink has the highest relative dynamic surface tension.

6. An inkjet ink set according to claim 5, wherein the yellow ink has the lowest relative dynamic surface tension.

7. An inkjet ink set according to claim 2, wherein the fluorocarbon surfactant and the hydrocarbon surfactant, each independently, is nonionic, anionic, cationic, or amphoteric.

8. An inkjet ink set according to claim 7, wherein the fluorocarbon and hydrocarbon surfactants are nonionic.

9. An inkjet ink set according to claim 2, wherein the fluorocarbon surfactant has a formula $(R_fQ)_nA$; wherein $R_f$ is a perfluoroalkyl group having 6 to 22 carbon atoms; Q is a divalent bridging group capable of connecting the $R_f$ with the A group; A is a water soluble group; and n is 1 or 2.

10. An inkjet ink set according to claim 2, wherein the fluorocarbon surfactant is an ethoxylated nonionic fluorocarbon surfactant having the formula $R_fCH_2CH_2O(CH_2CH_2O)_xH$, wherein $R_f$ is $F(CF_2CF_2)_y$, x is 0 to approximately 15, and y is 1 to approximately 7.

11. An inkjet ink set according to claim 7, wherein the fluorocarbon surfactant is formed at least in part from a polymer made based on oxetane chemistry having the formula below and including a pendant perfluoroalkyl group $R_f$

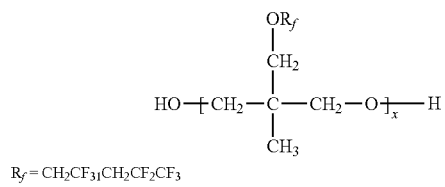

$R_f$ = $CH_2CF_3$, $CH_2CF_2CF_3$ wherein the length of the pendant perfluoroalkyl group is selected from the group consisting of $C_4F_9$ or shorter including $CF_3$, $C_2F_5$, $C_3F_7$ and $C_4F_9$.

12. An inkjet ink set according to claim 7, wherein the fluorocarbon surfactant is formed from at least a polymeric material having at least one polar group and having at least one pendant group comprising an $R_f$ group, the polymeric material having at least 2 repeat units, wherein each at least one polar group, independently, is selected from a group consisting of an anion-countercation; a cation-counteranion; an amphoteric group, and a non-ionic group;

wherein each $R_f$ group, independently, is selected from a group consisting of a fluorinated linear alkyl having from 1 to about 7 carbon atoms; and a fluorinated branched alkyl wherein the longest chain is from 1 to about 7 carbon atoms and each branch, independently, contains from 1 to about 3 carbon atoms; and wherein each $R_f$, whether linear or branched, has at least one carbon atom bonded to at least one fluorine atom; and wherein each $R_f$ group, independently, has at least 10% of the non-carbon atoms being fluorine atoms and the remaining non-carbon atoms being independently selected from the group consisting of: H, I, Cl, and Br.

13. An inkjet ink set according to claim 7, wherein the hydrocarbon surfactant is selected from the group consisting of tetrafunctional block copolymers of propylene oxide, ethylene oxide, and ethylene diamine; alkyl polyethylene oxides; polyethoxylated alcohols and esters; acetylenic polyethylene oxides, ethoxylated acetylenic polyethylene oxides; ethoxylated acetylenic diols; alkyl phenyl polyethylene oxides; octylphenoxypolyethoxyethanols; dioctyl sulfosuccinates; alkaryl sulfonate isopropylamine salts; N-octyl-2-pyrrolidones; ethylene oxide adducts of tridecyl alcohol; and combinations thereof.

14. An inkjet ink set according to claim 13, wherein the hydrocarbon surfactant is selected from the group consisting of alkyl polyethylene oxides, and ethoxylated acetylenic polyethylene oxides, and combinations thereof.

15. An inkjet ink set according to claim 13, wherein the hydrocarbon surfactant is selected from the group consisting of

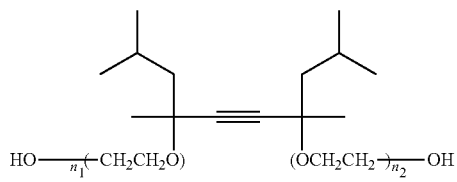

where $n_1$ and $n_2$ is 3.5;

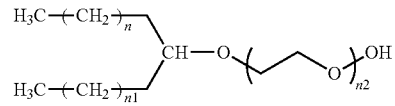

wherein $n+n_1$ is 12 and $n_2$ is 6, wherein $n+n_1$ is 12 and $n_2$ is 8; acetylenic polyethylene oxides including 2,4,7,9-Tetramethyl-5-decyne-4,7-diol, and combinations thereof.

16. An inkjet ink set according to claim 15, wherein the ink set comprises yellow, cyan, magenta, and black inks; and wherein the surfactant package for the cyan and magenta, yellow, and black inks comprises acetylenic polyethylene oxides including 2,4,7,9-Tetramethyl-5-decyne-4,7-diol,

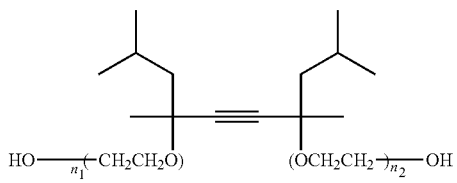

where $n_1$ and $n_2$ is 3.5 and acetylenic polyethylene oxides including 2,4,7,9-Tetramethyl-5-decyne-4,7-diol, and

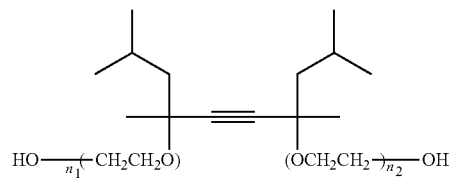

wherein $n+n_1$ is 12 and $n_2$ is 6 and wherein $n+n_1$ is 12 and $n_2$ is 8, respectively.

17. An inkjet ink set according to claim 16, wherein the surfactant package for each of the inks further includes an ethoxylated nonionic fluorocarbon surfactant having the formula $R_fCH_2CH_2O(CH_2CH_2O)_xH$, wherein $R_f$ is $F(CF_2CF_2)_y$, x is 0 to approximately 15, and y is 1 to approximately 7.

18. An inkjet ink set according to claim 1, wherein the dynamic surface tension differential between the first and second inks ranges from about 1 to about 6 dynes/cm.

19. An inkjet ink set according to claim 1, wherein the dynamic surface tension differential between the first and second inks ranges from about 2 to about 6 dynes/cm.

20. An inkjet ink set according to claim 1, wherein the dynamic surface tension differential between the first and second inks ranges from about 2 to about 5 dynes/cm.

21. An inkjet ink formulated for use as part of an inkjet ink set, comprising:
   a. an aqueous vehicle;
   b. at least one colorant dispersed in the vehicle, the ink having a pre-determined dynamic surface tension; wherein the ink is formulated for use with another ink having another aqueous vehicle, another at least one colorant different from the at least one colorant and dispersed in the another ink vehicle; and wherein the another ink has a pre-determined dynamic surface tension different than the dynamic surface tension of the ink; and wherein one ink is darker than the other ink and has a higher dynamic surface tension than the other ink; and wherein the one ink and the another ink have substantially similar static surface tensions.

22. An Inkjet ink according to claim 21, wherein both the one ink and the another inks, each independently, include a surfactant package comprising at least one fluorocarbon surfactant and at least one hydrocarbon surfactant.

23. An Inkjet ink according to claim 22, wherein the static surface tension of the one ink and the another ink is primarily affected by the fluorocarbon surfactant.

24. An Inkjet ink according to claim 22, wherein the difference in the dynamic surface tension of the one ink and the another ink is primarily affected by the hydrocarbon surfactant.

25. A method for enhancing bleed performance using an inkjet printer, comprising:
   a. ejecting at least one drop of a first inkjet ink comprising an aqueous vehicle and at least one colorant dispersed in the vehicle, the ink having a pre-determined dynamic surface tension;
   b. ejecting at least one drop of a second inkjet ink comprising an aqueous vehicle and at least one colorant different from the at least one colorant of the first ink and dispersed in the second ink vehicle, the second ink being darker than the first ink and having a pre-determined dynamic surface tension higher than that of the first ink, wherein the one ink and the another ink have substantially similar static surface tensions.

26. A method according to claim 25, wherein the first and second inks each independently include a surfactant package comprising at least one fluorocarbon surfactant and at least one hydrocarbon surfactant.

27. A method according to claim 25, wherein the wherein the dynamic surface tension differential between the first and second inks ranges from about 1 to about 6 dynes/cm.

28. An method according to claim 25, wherein the dynamic surface tension differential between the first and second inks ranges from about 2 to about 6 dynes/cm.

29. An method according to claim 25, wherein the dynamic surface tension differential between the first and second inks ranges from about 2 to about 5 dynes/cm.

30. A method according to claim 26, wherein the first and second inks comprise any two of yellow, cyan, magenta, and black inks; and wherein the surfactant package for the cyan and magenta, yellow, and black inks comprises acetylenic polyethylene oxides including 2,4,7,9-Tetramethyl-5-decyne-4,7-diol,

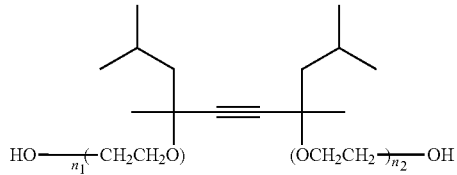

where $n_1$ and $n_2$ is 3.5 and acetylenic polyethylene oxides including 2,4,7,9-Tetramethyl-5-decyne-4,7-diol, and

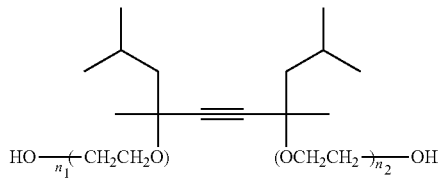

wherein $n+n_1$ is 12 and $n_2$ is 6 and wherein $n+n_1$ is 12 and $n_2$ is 8, respectively.

31. A method according to claim 30, wherein the surfactant package for each of the inks further includes an ethoxylated nonionic fluorocarbon surfactant having the formula $R_fCH_2CH_2O(CH_2CH_2O)_xH$, wherein $R_f$ is $F(CF_2CF_2)_y$, x is 0 to approximately 15, and y is 1 to approximately 7.

* * * * *

UNITED STATES PATENT AND TRADEMARK OFFICE
CERTIFICATE OF CORRECTION

PATENT NO. : 8,343,268 B2  
APPLICATION NO. : 11/290788  
DATED : January 1, 2013  
INVENTOR(S) : Zeying Ma et al.

Page 1 of 1

It is certified that error appears in the above-identified patent and that said Letters Patent is hereby corrected as shown below:

In the Claims:

In column 15, line 3, in Claim 1, delete "A" and insert -- a --, therefor.

In column 15, line 57, in Claim 11, delete "$R_f= CH_2CF_{31}CH_2CF_2CF_3$" and insert -- $R_f= CH_2CF_3,CH_2CF_2CF_3$ --, therefor.

In column 17, line 54, in Claim 22, delete "Inkjet" and insert -- inkjet --, therefor.

In column 17, line 58, in Claim 23, delete "Inkjet" and insert -- inkjet --, therefor.

In column 17, line 61, in Claim 24, delete "Inkjet" and insert -- inkjet --, therefor.

In column 18, line 19, in Claim 27, after "claim 25," delete "wherein the".

In column 18, line 22, in Claim 28, delete "An" and insert -- A --, therefor.

In column 18, line 25, in Claim 29, delete "An" and insert -- A --, therefor.

Signed and Sealed this  
Fourteenth Day of May, 2013

Teresa Stanek Rea  
*Acting Director of the United States Patent and Trademark Office*